US005657876A

United States Patent [19]
Drenter et al.

[11] Patent Number: 5,657,876
[45] Date of Patent: Aug. 19, 1997

[54] ABRASIVE GRIT MATERIAL RECOVERY SYSTEM

[75] Inventors: John Charles Drenter; Donald Charles Allebach, Jr., both of Davenport; Dieter Artur Konitzer, Jr., Walcott, all of Iowa

[73] Assignee: PCT, Inc., Davenport, Iowa

[21] Appl. No.: 472,408

[22] Filed: Jun. 7, 1995

Related U.S. Application Data

[62] Division of Ser. No. 215,280, Mar. 21, 1994, Pat. No. 5,520,288.

[51] Int. Cl.⁶ ............................................... B03C 1/00
[52] U.S. Cl. ................... 209/223.1; 209/224; 209/225; 209/232
[58] Field of Search .......................... 209/225, 224, 209/223.1, 232, 231, 215, 636

[56] References Cited

U.S. PATENT DOCUMENTS

| | | | |
|---|---|---|---|
| 832,823 | 10/1906 | Wait | 209/232 X |
| 1,576,690 | 3/1926 | Ullrich | 209/225 X |
| 1,866,781 | 7/1932 | Ullrich | 209/231 |
| 3,045,822 | 7/1962 | Cavanagh | 209/231 X |
| 3,409,126 | 11/1968 | Kennedy, Jr. | |
| 3,691,689 | 9/1972 | Goff | |
| 3,716,946 | 2/1973 | Graf | |
| 3,756,377 | 9/1973 | Goff | |
| 3,858,359 | 1/1975 | Leliaert | |
| 3,877,175 | 4/1975 | Snyder | |
| 3,934,373 | 1/1976 | Leliaert et al. | |
| 3,977,128 | 8/1976 | Goff | |
| 3,981,104 | 9/1976 | Dreher | |
| 4,020,597 | 5/1977 | Shigyo et al. | |
| 4,035,958 | 7/1977 | Nishio | |
| 4,121,388 | 10/1978 | Wilson | |
| 4,202,142 | 5/1980 | Van Fossen | |
| 4,275,531 | 6/1981 | Van Fossen | |
| 4,336,671 | 6/1982 | Nelson | |
| 4,364,823 | 12/1982 | Goff | |
| 4,370,836 | 2/1983 | Hockett | |
| 4,382,352 | 5/1983 | Nelson | |
| 4,394,256 | 7/1983 | Goff | |
| 4,416,092 | 11/1983 | Nelson | |
| 4,433,511 | 2/1984 | Swain | |
| 4,449,331 | 5/1984 | MacMillan | |
| 4,545,156 | 10/1985 | Hockett | |
| 4,693,041 | 9/1987 | Dickson | |
| 4,773,189 | 9/1988 | MacMillan et al. | |

(List continued on next page.)

FOREIGN PATENT DOCUMENTS 43095 of 1917 Sweden ........................... 209/231

*Primary Examiner*—David H. Bollinger
*Attorney, Agent, or Firm*—Woodard, Emhardt, Naughton, Moriarty & McNett

[57] ABSTRACT

A mobile apparatus and process for the separation and recovery of abrasive grit material from blasting material containing waste material and contaminants. The mobile apparatus has a low profile which facilitates the movement of the apparatus to job sites. At the job site the blasting material is collected by the mobile apparatus through a flexible hose connected to a chamber which is under sub atmospheric pressure. A vacuum generator that reduces the pressure in the chamber has sufficient power to allow vacuum collection of the blasting material through the flexible hose when material flow might otherwise clog the hose. The abrasive grit material is removed from the blasting material by self-contained, multi-step separation process situated within the chamber. The mobile apparatus utilizes an initial physical separator, a rotary screen separator, a magnetic separator, and an air wash separation device that are interconnected by a rotary lift wheel. The substantially pure abrasive grit material must pass through an airlock in order to exit the chamber during the recovery process. The abrasive grit material is transported by a conveyor to a holding bin on the mobile apparatus, and in certain embodiments can be transferred to blast pots mounted on the mobile apparatus for further blasting use.

22 Claims, 15 Drawing Sheets

U.S. PATENT DOCUMENTS

| | | |
|---|---|---|
| 4,943,368 | 7/1990 | Gilbert et al. . |
| 5,161,337 | 11/1992 | Swain . |
| 5,185,968 | 2/1993 | Lyras . |
| 5,195,640 | 3/1993 | Seaverns . |
| 5,212,911 | 5/1993 | Benson . |
| 5,231,806 | 8/1993 | Swain . |
| 5,269,424 | 12/1993 | Lyras . |
| 5,468,174 | 11/1995 | Bachand et al. . |

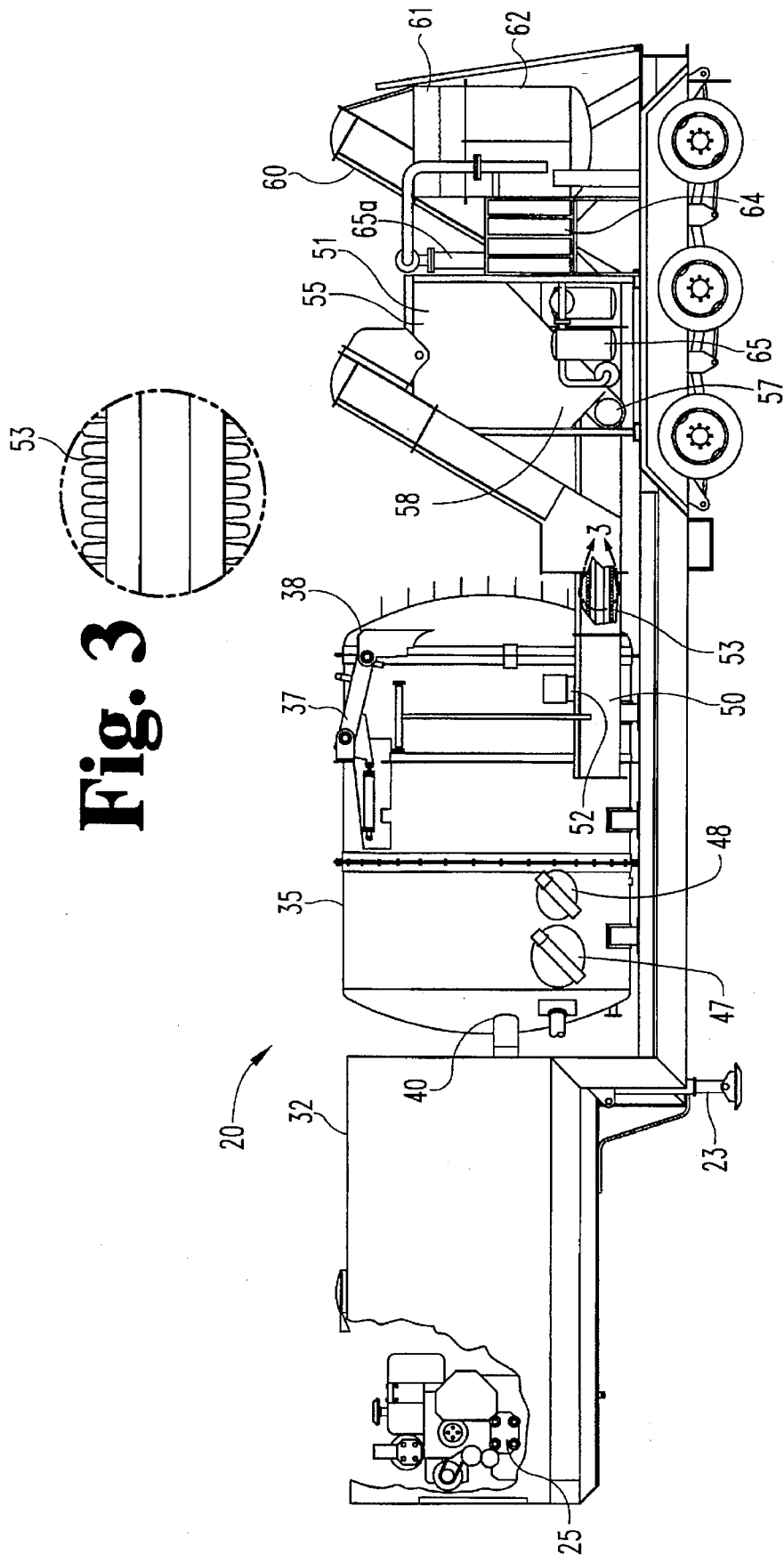

ABRASIVE GRIT MATERIAL RECOVERY SYSTEM

This application is a division of application Ser. No. 08/215,280, filed Mar. 21, 1994, now U.S. Pat. No. 5,520,288.

BACKGROUND OF THE INVENTION

The present invention relates in general to abrasive material separation systems. In particular the present invention relates to a mobile apparatus and process for collecting and recovering abrasive grit material from blasting material containing contaminants created during a pressure blasting process.

Abrasive blasting of steel structures, such as highway bridges, is a necessary step in maintenance of structures. One particular problem encountered with structures such as bridges is that the past painting history of the structure typically will include a lead based paint. The lead dust is considered quite toxic and is increasingly regulated. An approach to controlling the environmental problem associated with the lead dust is to recover all the abrasive grit and waste material associated with the pressure blasting process. If the abrasive grit material is not separated from the lead dust and other blasting site waste, an undesirably high quantity of hazardous waste remains for subsequent disposal. A mobile apparatus having an abrasive grit material recovery system provides the process for accomplishing this entire task.

In the past devices for the recovery of abrasive grit blasting material have used magnets, rotary brooms, mechanical conveyors and elevators, as well as induced air currents to recover and recycle the abrasive particles with varying degrees of success. The prior devices for recovering abrasive grit material created during pressure blasting have had common limitations.

The first limitation is that the devices have tended to be heavy and bulky in nature and therefore not readily transportable to a job site. More particularly the vertical elevation of the devices have often interfered with passage beneath structures, such as highway and railroad bridges. A second limitation is that the recovery of the abrasive grit blasting material is often undertaken in an environment at substantially atmospheric pressure with open transfer between stages. This may allow grit and dust to be expelled into the environment which produces an undesirable high quantity of pollution. A third limitation is that the devices have generally not been integrated, and require multiple pieces of equipment to collect and process the material created by pressure blasting.

Even with the variety of earlier designs, there remains a need for an integrated mobile apparatus for collecting and recovering abrasive grit material that minimizes the grit and dust expelled into the environment during the recovery of the abrasive grit material, yet has a low profile design to avoid interfering with structures, such as highway and railroad bridges. The present invention satisfies this need in novel and unobvious ways.

SUMMARY OF THE INVENTION

To address the unmet needs of prior apparatuses for separation and recovery of abrasive grit material, one form of the present invention contemplates a mobile apparatus for the separation and recovery of magnetically attractable abrasive grit material from blasting material containing non magnetically attractable waste material and magnetically attractable abrasive grit material, comprising: a vacuum generator; a chamber having a blasting material inlet and a vacuum outlet, the vacuum outlet being connected to the vacuum generator for reducing the pressure in the chamber, the blasting material inlet being suitable for receiving blasting material; a magnetic separator disposed within the chamber for separating the magnetically attractable abrasive grit material from the blasting material; a flexible hose coupled to the blasting material inlet for providing a collection path for blasting material, the hose having a collection end; and the vacuum generator having sufficient capacity to allow vacuum collection through the flexible hose.

Another form of the present invention is an apparatus for the separation and recovery of abrasive grit material from blasting material containing waste material and abrasive grit material, comprising: a vacuum generator; a chamber having a blasting material inlet and a vacuum outlet, the vacuum outlet being connected to the vacuum generator for reducing the pressure in the chamber, the blasting material inlet being suitable for receiving blasting material; a mechanical separator coupled to the blasting material inlet, the mechanical separator having three outlets, a first outlet for high purity abrasive grit material, a second outlet for waste material substantially free of abrasive grit material, and a third outlet for mixed waste material and abrasive grit material.

Objects and advantages of the present invention will be apparent from the following description.

BRIEF DESCRIPTION OF THE DRAWINGS

FIG. 2 is a side elevational view of the opposite side of the abrasive grit blasting recovery system of FIG. 1.

FIG. 3 is an enlarged partial side elevational view of the conveyor belt 53 of FIG. 2.

DESCRIPTION OF THE PREFERRED EMBODIMENT

Figure 1:
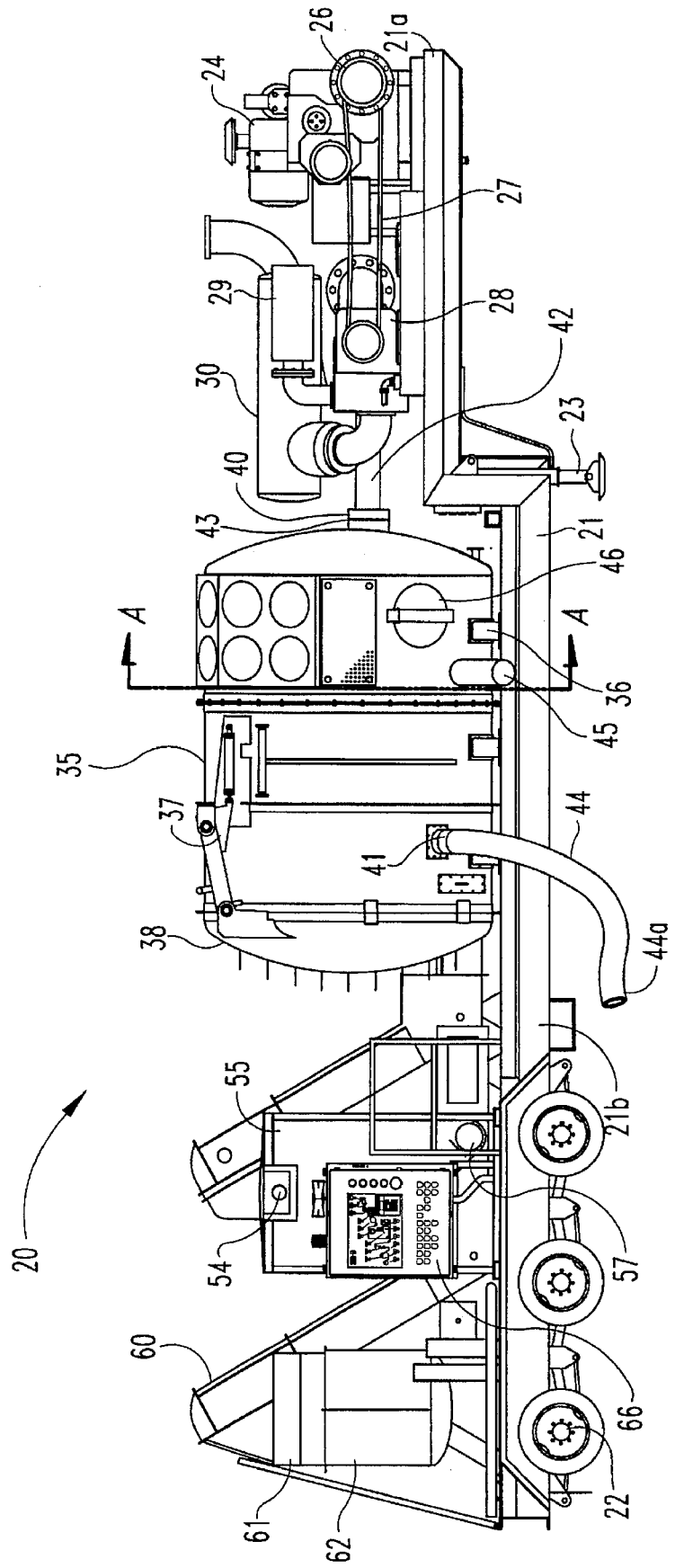
FIG. 1 is a side elevational view of one side of an abrasive grit blasting recovery system according to a typical embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to FIGS. 1–3, there is illustrated a mobile apparatus 20 for the separation and recovery of magnetically attractable abrasive grit material from blasting material containing non-magnetically attractable waste material and contaminants.

The mobile apparatus 20 comprising a self-contained trailer 21 having wheels and axle assemblies 22, multiple telescopically extendable stabilizer arms 23 which extend from the trailer 21 and can be deployed therefrom stabilizing the trailer 21 during use. Trailer 21 can be thought of or viewed as having two portions, a power plant portion 21a and a deck portion 21b. The power plant portion 21a is raised above the deck portion 21b, thereby facilitating the coupling of mobile apparatus 20 to a conventional over-the-road tractor for ease of movement across town or across the country. Mounted on the power plant portion 21a of trailer 21 is a diesel engine 24 that is the primary power source for operating the abrasive grit material recovery system. A hydraulic pump 25 is driven by the diesel engine 24 and delivers high pressure fluid that drives a multitude of hydraulic motors utilized throughout the mobile apparatus 20. Further, the diesel engine 24 includes an alternator and compressor (not illustrated) for delivering electrical power and compressed air necessary for the control and operation of the abrasive grit material recovery system.

A power take off unit, generally known in the art, transfers power generated by the diesel engine 24 to a drive belt assembly 26. The drive belt assembly 26 including drive belt 27 is utilized to drive a vacuum generator 28. In the preferred embodiment the vacuum generator is a positive displacement blower most preferably capable of drawing up to 27 inches of mercury (Hg), and has a capacity of 1800 CFM. A Roots DVJ model blower or equivalent is an acceptable choice for vacuum generator 28. The vacuum generator 28 provides the necessary vacuum power for the abrasive grit material recovery system. Although for light work the operating vacuum within the chamber may be only several inches of mercury, it is preferred that the vacuum capability of the vacuum generator be at least 20 inches of mercury and more preferably at least 25 inches of mercury for continuous operation. This is desirable for those situations where the material would otherwise clog the flexible hose used to collect the blasting material. A jet air intake 29 is coupled to the inlet side of vacuum generator 28, and a blower discharge silencer 30 is coupled to the outlet side for reducing the noise emanating from the unit. Further, a sound insulated enclosure 32 covers the power plant portion 21a of trailer 21, thereby enclosing the diesel engine 24, vacuum generator 28, and other related power generating equipment. Furthermore, a series of three service doors (not illustrated) allow access within the sound insulated enclosure 32.

A substantially cylindrical chamber 35, having an enclosed interior volume, is coupled to a plurality of chamber mounts 36 which in turn are affixed to the deck portion 21b of trailer 21. Within the confines of chamber 35 the abrasive grit blasting material is separated and recovered from the waste material, contaminants, and other foreign objects. A detailed description of the separation and recovery of the abrasive grit material from the contaminants and waste material is provided later. An access door lift assembly 37 is pivotally mounted to the upper side of the chamber 35. The access door lift assembly 37 functions to open and close an access door 38, which allows access to the interior volume of chamber 35.

The chamber 35 has a vacuum outlet 40 and a blasting material inlet 41 formed thereon. The vacuum outlet 40 being located in close proximity to the vacuum generator 28. A conduit 42 is connected between the vacuum generator 28 and the vacuum outlet 40 for allowing the vacuum generator 28 to reduce the pressure within the chamber 35. A secondary filter 43 is connected to the chamber 35 such that the air moving through the vacuum outlet 40 passes through this filter. This secondary filter 43 provides the final protection for the vacuum generator 28. The blasting material inlet 41 is suitable for receiving blasting material into the chamber 35. Connectable with the blasting material inlet 41 is a flexible hose 44 (actually much longer than shown), which includes a collection end 44a, that provides a collection path for the blasting material. The vacuum generator 28 has sufficient capacity for collecting the blasting material from the job site and transporting it through the hose 44 and into chamber 35 for processing. In the most preferred embodiment from the point where the blasting material enters the collection hose 44 it remains physically contained within the mobile apparatus 20 during the separation and recovery of the abrasive grit material from the blasting material. Further, in the most preferred embodiment the separation and recovery of the abrasive grit material from the blasting material is done under the reduced pressure in chamber 35.

A central clean out auger outlet 45 is provided on the lower cylindrical portion of chamber 35 for facilitating the removal of waste material. This outlet enables the waste material to be removed from the chamber through one common outlet. A clean out auger is located within the chamber for delivering the material to auger outlet 45. Additionally, there is a contaminant access door 46, a secondary vacuum filter access door 47, and an air wash fan access door 48 located on the cylindrical chamber 35. These access doors allow convenient access to the filters and components located inside of chamber 35 by a service technician.

The first abrasive grit material transfer conveyor 50 transports substantially pure abrasive grit material that has been recovered within chamber 35 to a clean abrasive grit storage bin 51. Substantially pure abrasive grit material exits chamber 35 through an outlet port 52 after passing through an airlock that is disposed within chamber 35. After exiting through the outlet port 52 the abrasive grit material is deposited onto a transfer conveyor belt 53 which in turn transports and elevates the abrasive grit material to the grit storage bin 51. A hydraulic motor (not illustrated) is coupled to the conveyor 50 for driving the belt 53. The belt 53, as shown in FIG. 3, comprises a plurality of upstanding cylindrical protuberances for holding the abrasive grit material in place as the belt 53 is moved.

In the preferred embodiment, the clean abrasive grit storage bin 51 is designed to store abrasive grit material. A dispersion auger 54 is situated within an upper portion 55 of the clean grit storage bin 51. The dispersion auger 54 functions to distribute the abrasive grit material across the storage bin 51 such that a substantially level pile of material is maintained. An unloading outlet auger 57 is disposed in the lower portion 58 of the storage bin 51 for removing the blasting grit material therefrom. Both the dispersion auger 54 and the unloading auger 57 are powered by hydraulic motors.

Figure 4:
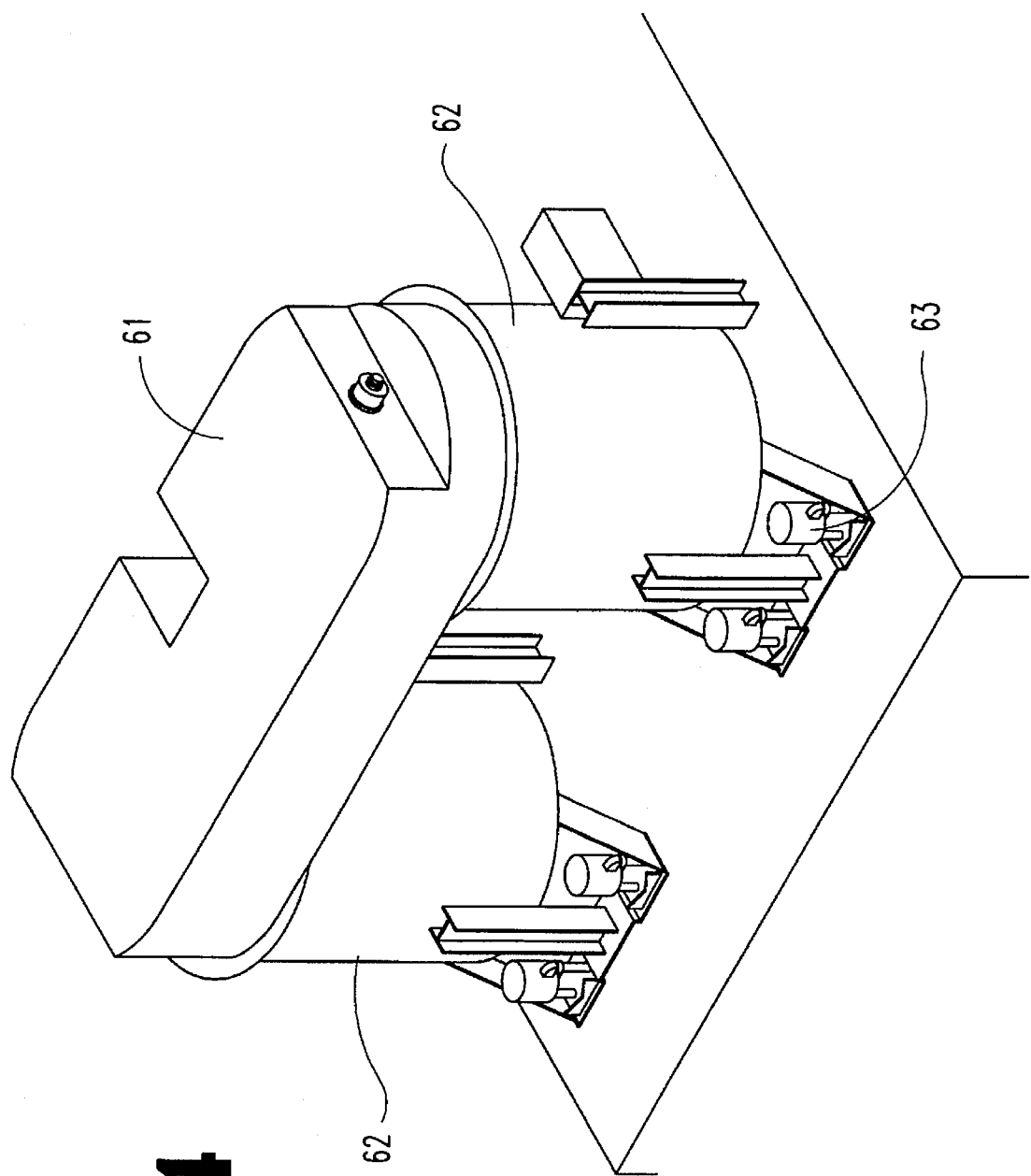
FIG. 4 is a perspective view of the abrasive grit blasting portion of the FIG. 1 abrasive grit blasting recovery system.

A second transfer conveyor 60, similar to the first transfer conveyor 50, functions to transfer the clean abrasive grit material from the storage bin 51 to a the blast pot hopper 61. Referring now to FIG. 4, there is illustrated the abrasive grit blasting portion of mobile apparatus 20. The blast pot hopper 61 stores the substantially pure abrasive grit material for feeding into the blast pots 62. Pinch valves 63 are connected to the blast pots 62, and operable to enable the service technician using the blasting unit to start and stop the flow of abrasive grit material. In the preferred embodiment, the pinch valves 63 are pneumatically controlled. An external air source (not illustrated) provides the necessary compressed air to drive the abrasive blasting material into the work product. An air drying system comprising an aftercooler 64, a moisture separator 65, and a heat exchanger 65a are utilized to remove water from the pressurized air and to reduce the temperature of the air. Further, the heat exchanger 65a also reheats the pressurized air before it is delivered to the work site to minimize condensation.

The overall height of the mobile apparatus 20 as measured between the point where the tires contact the roadway and its highest elevation is most preferably about eleven feet six inches. It is preferred that this height be less than 13 feet and more preferred that it be less than 12 feet. Further, an interactive control panel 66 provides troubleshooting flow diagrams, key pad data displays, an alarm horn, a system fault horn, and the like, for aiding the technician in operating this machine.

Figure 5:
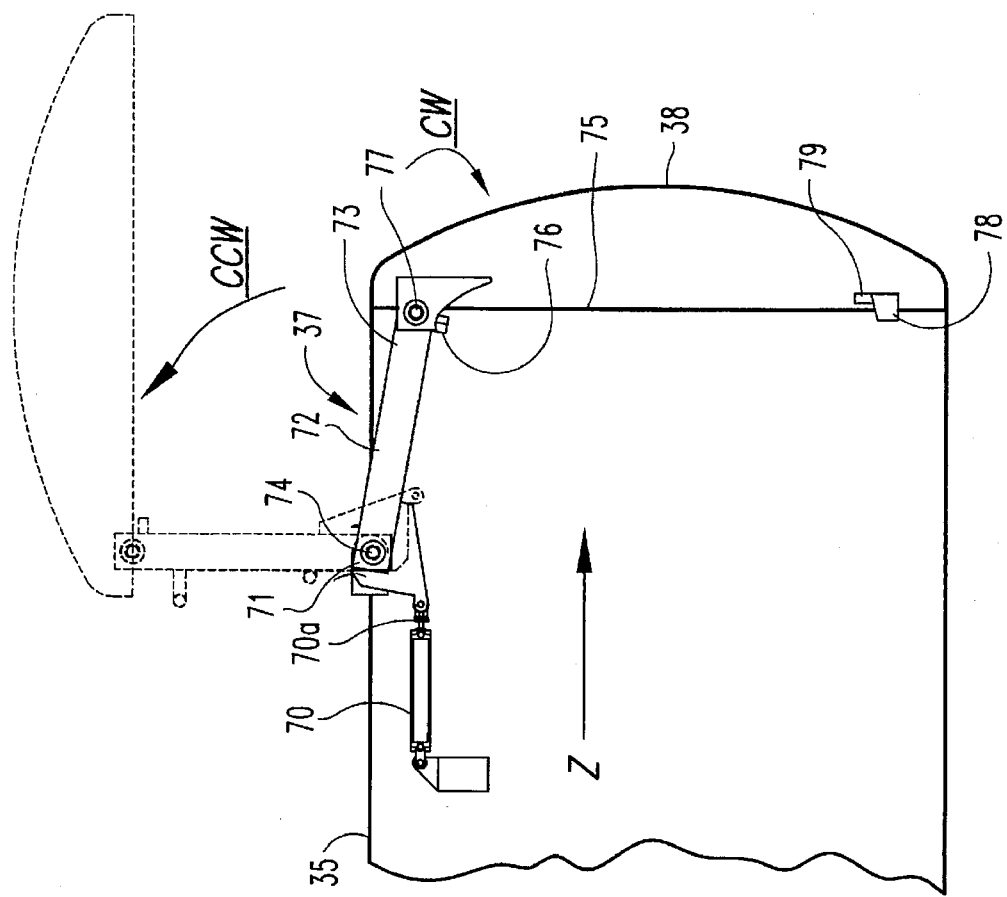
FIG. 5 is an enlarged side elevational view of the FIG. 2 access door lift assembly 37 in a closed position, and shown in an open position by phantom lines.

Referring to FIG. 5, there is illustrated chamber 35 having the access door lift assembly 37 shown in a closed position, and alternately shown by phantom lines in an open position. In the preferred embodiment, the access door lift assembly 37 comprises a pair of hydraulic cylinders 70 (only one illustrated) that are fixedly mounted to the outside surface of chamber 35. Each hydraulic cylinder 70 has a moveable ram end 70a that is coupled to a first end 71 of a lift arm 72. The first end 71 of lift arm 72 is pivotally mounted to the chamber 35, and an opposite second end 73 of lift arm 72 is pivotally mounted to access door 38. The ram end 70a is extended in the direction of arrow Z when high pressure hydraulic fluid is received by the hydraulic cylinder 70 from hydraulic pump 25. A network of pumping and pressure relief valves (not illustrated) is incorporated into mobile apparatus 20 for the delivery of high pressure fluid.

The high pressure fluid extends the ram end 70a in the direction of arrow Z, thereby forcing the first end 71 of lift arm 72 to rotate about pivot point 74. The continued extension of ram end 70a in the direction of arrow Z causes the lift arm 72 to rotate in a counterclockwise direction. This counterclockwise rotation of lift arm 72 raises the access door 38 from a closed position adjacent an end 75 of chamber 35. A mechanical stop 76, which includes a bolt and stop plate combination, are affixed to the lift assembly 37 to limit the degree of rotation of access door 38 about a second pivot point 77. The bolt is adjusted to contact the stop plate and thereby limit the clockwise rotation of access door 38 about pivot point 77. A substantially identical arrangement between a second hydraulic cylinder 70 and a lift arm 72 is located on the other side of chamber 35. The two lift arms are coupled together by a series of cross braces. An elastomeric gasket (not illustrated) is positioned between the access door 38 and end 75 of chamber 35 for providing a substantially air tight seal. Further, a plurality of access door latches are disposed between the chamber 35 and the access door 38. The latches comprise an interengaging pair of members 78 and 79. The first member 78 is affixed to chamber 35 and extends from the chamber 35 such that the second member 79, that is affixed to the access door 38, can be coupled with it. The latch is designed to have the second member 79 slide substantially vertical into engagement with the first member 78.

Figure 6:
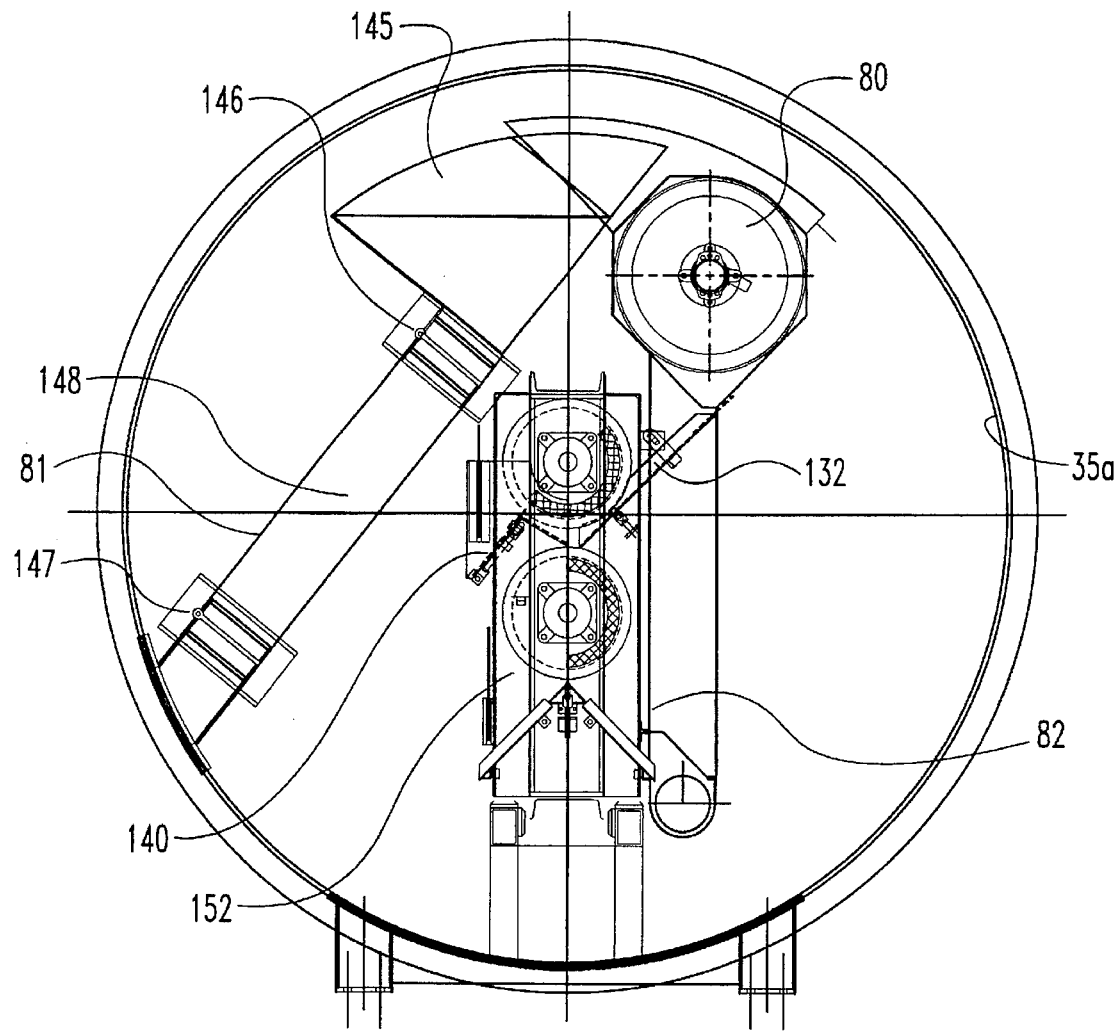
FIG. 6 is an end elevational view of the abrasive grit blasting recovery system chamber of FIG. 1 having the access door removed.

In FIG. 6, there is illustrated an end elevational view of chamber 35 with the access door 38 removed. This view depicts the relative positions between a rotary scalper 80, an airlock 81, and a magnetic separator 82. Details of the immediately preceding elements will be discussed hereinafter.

Figure 7:
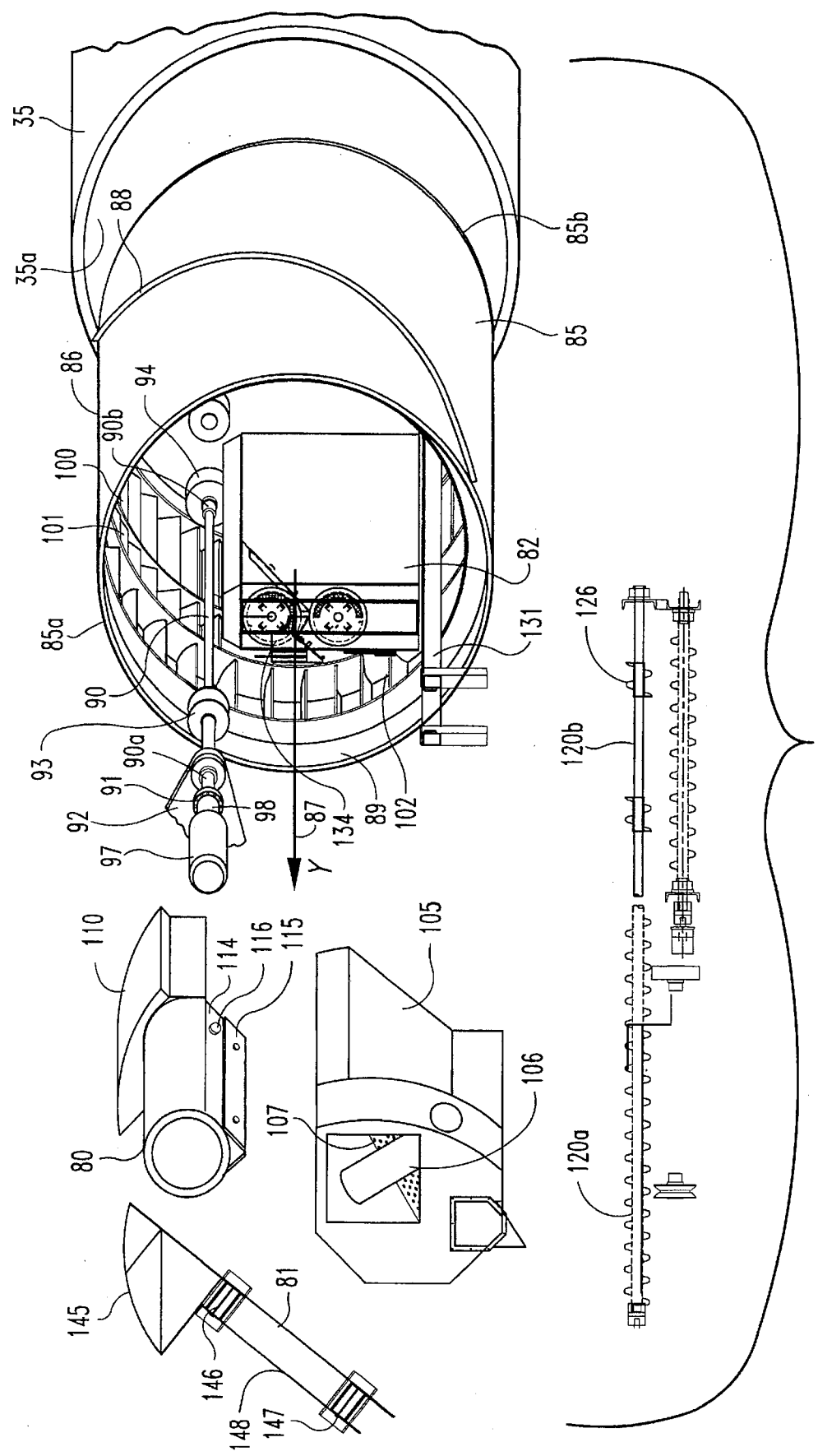
FIG. 7 is an exploded view of the components situated within the abrasive grit blasting recovery system chamber 35 of FIG. 1.

With reference to FIG. 7, there is illustrated an exploded view of the major components comprising the abrasive grit material recovery system disposed within chamber 35. A rotatable lift wheel 85 having a central axis of rotation Y is disposed within chamber 35. The lift wheel has a first end 85a and an opposite second end 85b. The lift wheel 85 defines a substantially cylindrical drum having an outer cylindrical surface 86 and an inner cylindrical surface 87. The outer cylindrical surface 86 includes a raised helical sweeper portion 88 extending around one half of the circumference of lift wheel 85. The raised helical sweeper 88 pushes any blasting material that is situated between the outer circumferential surface 86 of the lift wheel 85 and an inner circumferential surface 35a of chamber 35, to a location that is convenient for a technician to reach when the access door 38 is opened. The first end 85a of the inner cylindrical surface 87 has a raised v-shaped ridge 89 formed circumferentially thereon.

The lift wheel 85 is rotatably coupled within chamber 35 to a pair of drive shafts 90 that are positioned 120° apart. The drive shafts 90 extend parallel to the central axis Y of lift wheel 85 and have a first end 90a, and an opposite second end 90b. The second end 90b of drive shaft 90 is rotatably mounted within a bearing that is affixed to a mounting plate attached to chamber 35 (not illustrated), and the first end 90a is rotatably mounted within a bearing 91 that is affixed to a mounting bracket 92 which is connected to chamber 35. These bearings and associated mounting brackets support the drive shaft 90, thereby maintaining radial clearance between the inner surface 35a of chamber 35 and the outer surface 86 of lift wheel 85. Further, the drive shafts 90 rotate the lift wheel 85 about its central axis of rotation Y.

Fixedly mounted on the first end 90a of drive shaft 90 is an elastomeric grooved drive wheel 93 that rides on the v-shaped ridge 89 formed on the inner circumferential surface 87 of lift wheel 85. The opposite second end 90b of drive shaft 90 also has an elastomeric drive wheel 94 fixedly mounted thereto. A hydraulic motor 97 is coupled to the first end 90a of drive shaft 90 by a flexible motor mount 98. Each hydraulic motor rotates drive shaft 90, thereby causing the drive wheels 93 and 94 to rotate the lift wheel 85 about its central axis Y. The lift wheel is designed to operate at a speed of four to ten revolution per minute.

Figure 8:
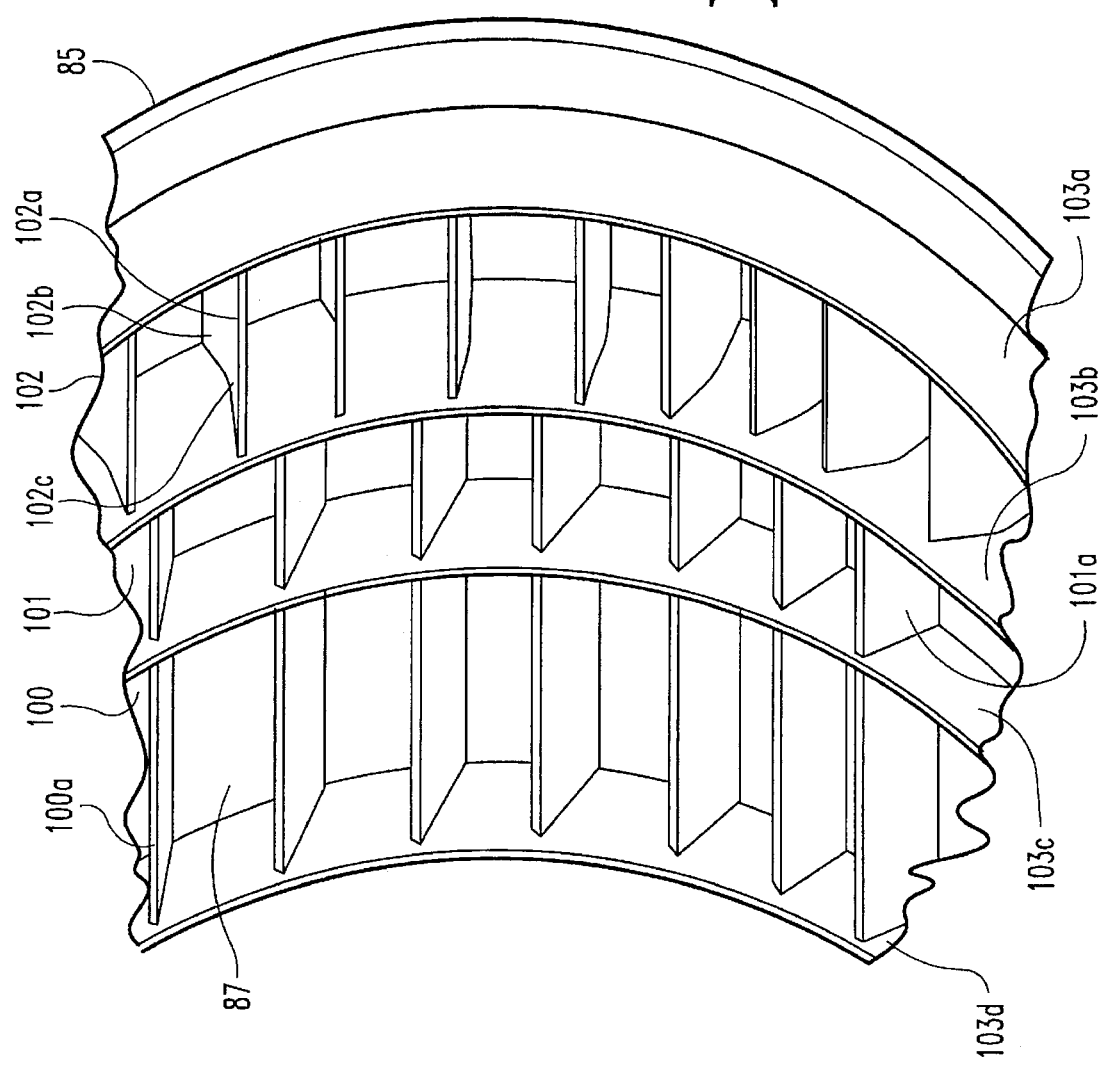
FIG. 8 is an enlarged partial view of the lift wheel 85 of FIG. 7.

In the preferred embodiment the inner cylindrical surface 87 of lift wheel 85 is divided into three discrete flight portions. A first flight portion 100 moves blasting material to the rotary scalper 80, a second flight portion 101 moves recyclable material from the magnetic separator 82 to the rotary scalper 80, and a third flight portion 102 moves substantially pure abrasive grit material from the magnetic separator 82 to the air lock 81. The three lift wheel flight portions that are illustrated in FIG. 8, include paddles and dividing rings positioned on the inner cylindrical surface 87 of lift wheel 85. In the preferred embodiment all the dividing rings extend inward a radial distance of four inches towards the central axis Y, and the paddles regardless of their configuration extent inward a radial distance of two and one half inches. The paddles 102a that are attached to the third flight 102 of lift wheel 85 are disposed between a pair of dividing rings 103a and 103b. In the preferred embodiment paddle 102a includes a short radial portion 102b, and a longer portion 102c that is disposed at a twenty-five degree angle to the radial portion 102b. The paddle 102a retains the substantially pure abrasive grit blasting material until the lift wheel 85 has revolved sufficiently to dump the individual paddle 102a. In the preferred embodiment the paddles 101a of the second flight portion 101 are separated from the third flight portion 102 by the dividing ring 103b. The paddles 101a of the second flight portion 101 have a substantially shorter axial length than the paddles 102a of the third flight 102. Paddles 101a of the second flight portion 101 have a different configuration than the paddles 102a of the third flight portion 102. The paddles 101a are disposed between dividing rings 103b and 103c, and in the preferred embodiment are inclined at a fifty degree angle to the inner cylindrical surface 87 of lift wheel 85. The configuration of paddles 101a enables the individual paddle to dump the blasting material sooner than would be obtained by paddle 102a of the third flight portion 102. First flight portion 100 includes paddles 100a that are substantially similar to paddles 101a of the second flight portion 101. In the preferred embodiment the paddles 100a of the first flight portion 100 are disposed between dividing rings 103c and 103d. The paddles 100a in the first flight portion 100 have an axial length comparable to the axial length of the paddles 102a of the third flight portion 102.

Figure 9:
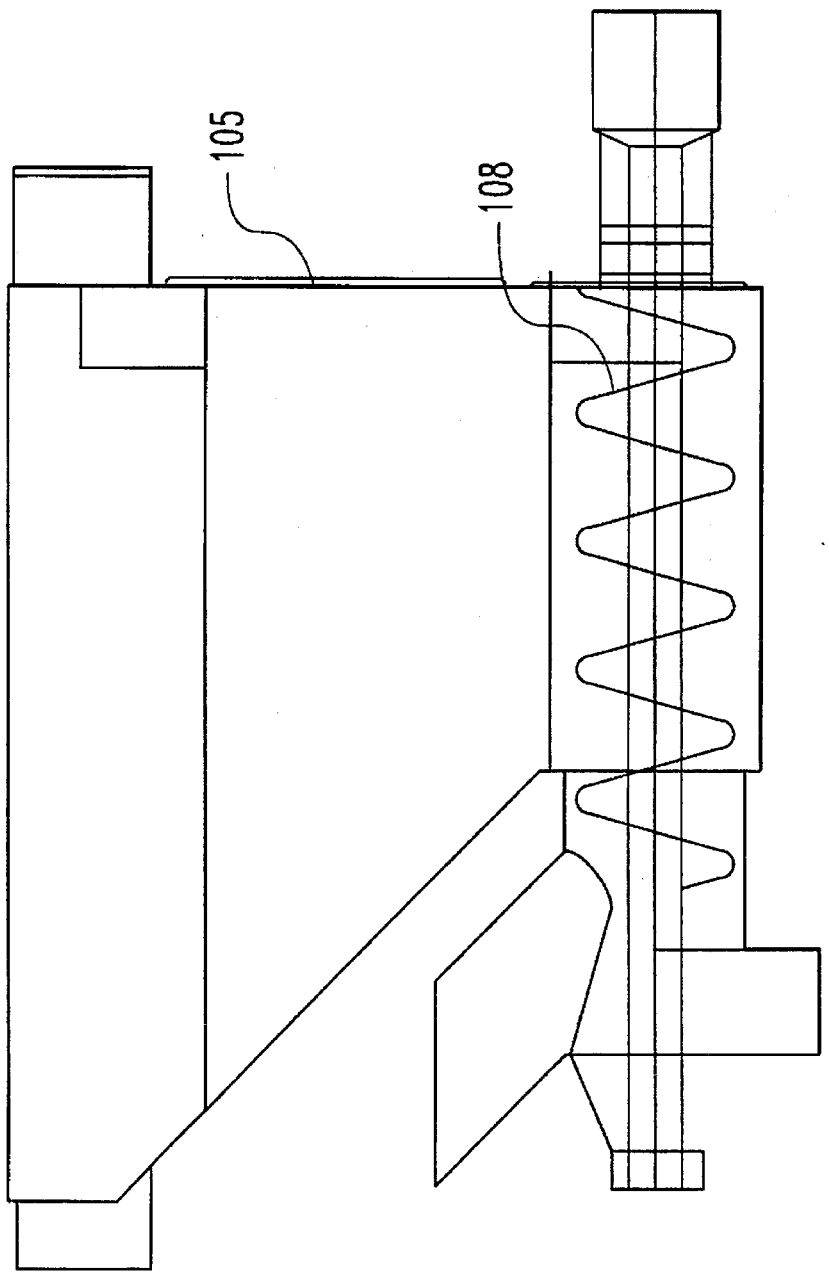
FIG. 9 is an illustrative side view of the knockout hopper 105 of FIG. 7.

The blasting material enters the knock out hopper 105 through a conduit 106 that is connected to the blasting material inlet 41. The knock out hopper 105 is configured to decelerate the incoming material and perform a physical screening of the blasting material. As illustrated in FIGS. 7 and 9, the knock out hopper 105 includes a steel grate 107 having one inch square openings for sorting the blasting material. A door has been removed from the front of the knock out hopper 105 to facilitate an understanding of the blasting material flow through the hopper. Any of the blasting material that does not pass through grate 107 is removed by a service technician, and the remaining material drops into the body of the hopper. Situated within the bottom of the knock out hopper is a metering auger 108 designed for transferring material to the first flight portion 100 of lift wheel 85. The metering auger 108 is adjustable to set the volumetric flow rate of material out of the knock out hopper 105 and to the first flight portion 100 of the lift wheel 85. The lift wheel 85 transports the blasting material to an input chute 110. Of the rotary scalper 80.

Figure 10:
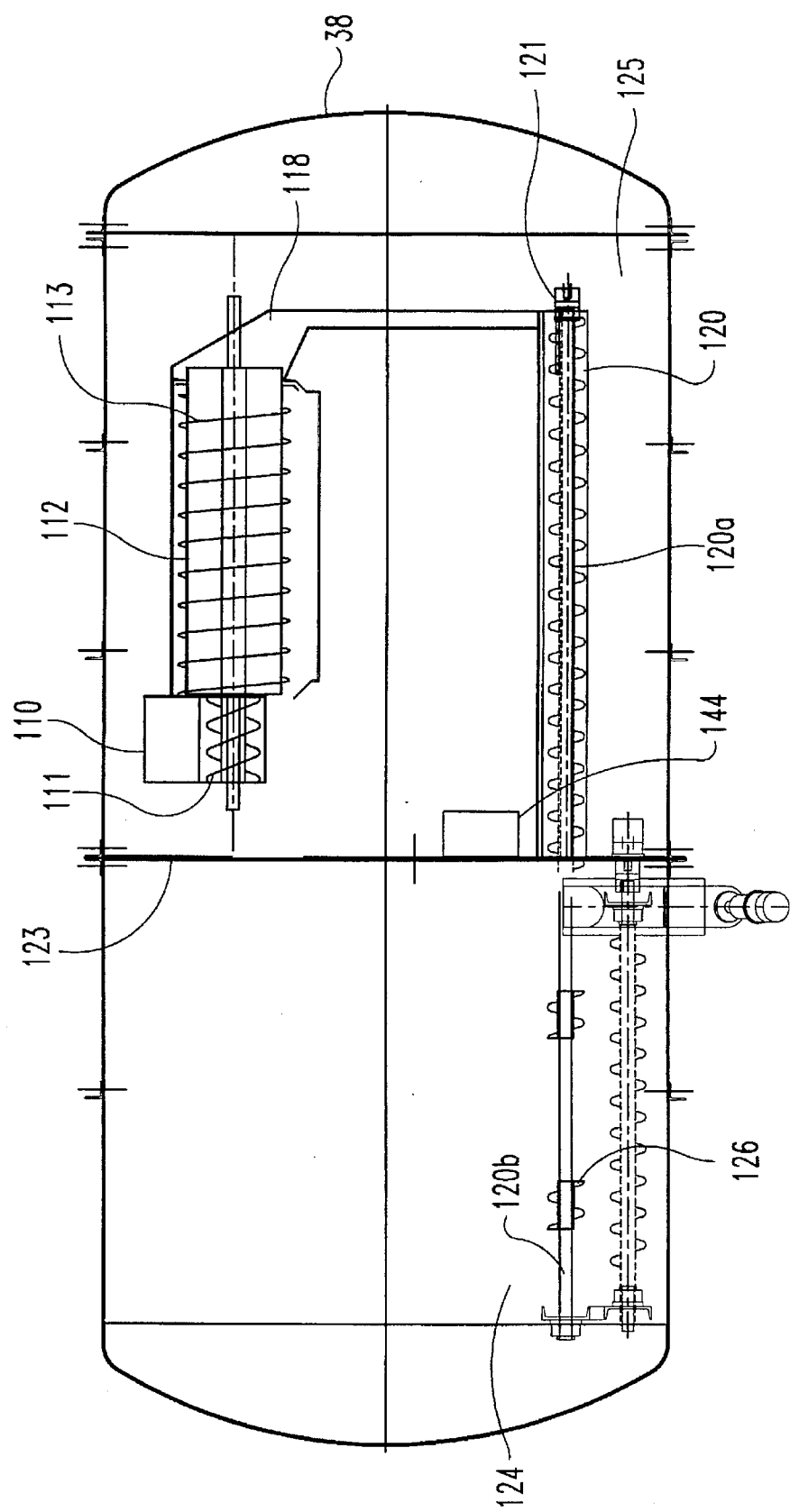
FIG. 10 is a cut-a-way illustrative view of the rotary scalper 80 and material transport auger 120 of FIG. 7.

The rotary scalper 80 shown in FIGS. 7 and 10 separates the waste material greater than 3/16 inch in diameter from the remaining blasting material. An auger 111 is fixedly disposed within a steel mesh barrel 112. The steel mesh barrel is fabricated out of a perforated material that permits any material less than 3/16 inch in diameter to be gravity fed into a housing 114 that is disposed below the barrel. A helical distributor 113 is formed on the outer cylindrical surface of barrel 112 for facilitating the movement of blasting material across the steel mesh, and thereby preventing the blasting material from remaining in one location which would wear the steel mesh prematurely. The auger 111 and steel mesh barrel 112 rotate as an assembly.

A moveable plate 115 is connected to housing 114 for adjusting the volumetric flow rate of blasting material out of the rotary scalper 80. A sensor 116 detects when the blasting material builds up above a predetermined level and if the level is not reduced within a predetermined period of time the vacuum collection is shut down. A waste material exit chute 118 receives the blasting material that does not drop through the steel mesh barrel 113. The waste material exit chute 118 transports the waste material by gravity to a centralized waste auger 120 that is disposed within the chamber 35. The waste auger 120 runs the length of chamber 35 and includes two portions, a material transport portion 120a and a material storage portion 120b.

The waste auger 120 is driven by a single hydraulic motor 121. Hydraulic motors such as motor 121 are reversible so as to allow ready dislodging of jammed parts and materials. A dividing wall 123 splits the chamber 35 into a forward chamber portion 124 and a rear chamber portion 125. The material transport portion 120a of the waste auger 120 transports the waste material to the forward chamber portion 124 of chamber 35. Contained within the forward chamber portion 124 is the material storage portion 120b of waste auger 120 that accumulates the waste material to a uniform height across the chamber. Material storage portion 120b of waste auger 120 includes spaced apart auger blade sections for moving the material. The axial distance between the auger blade sections determines the pile height of the accumulated waste material.

Figure 11:
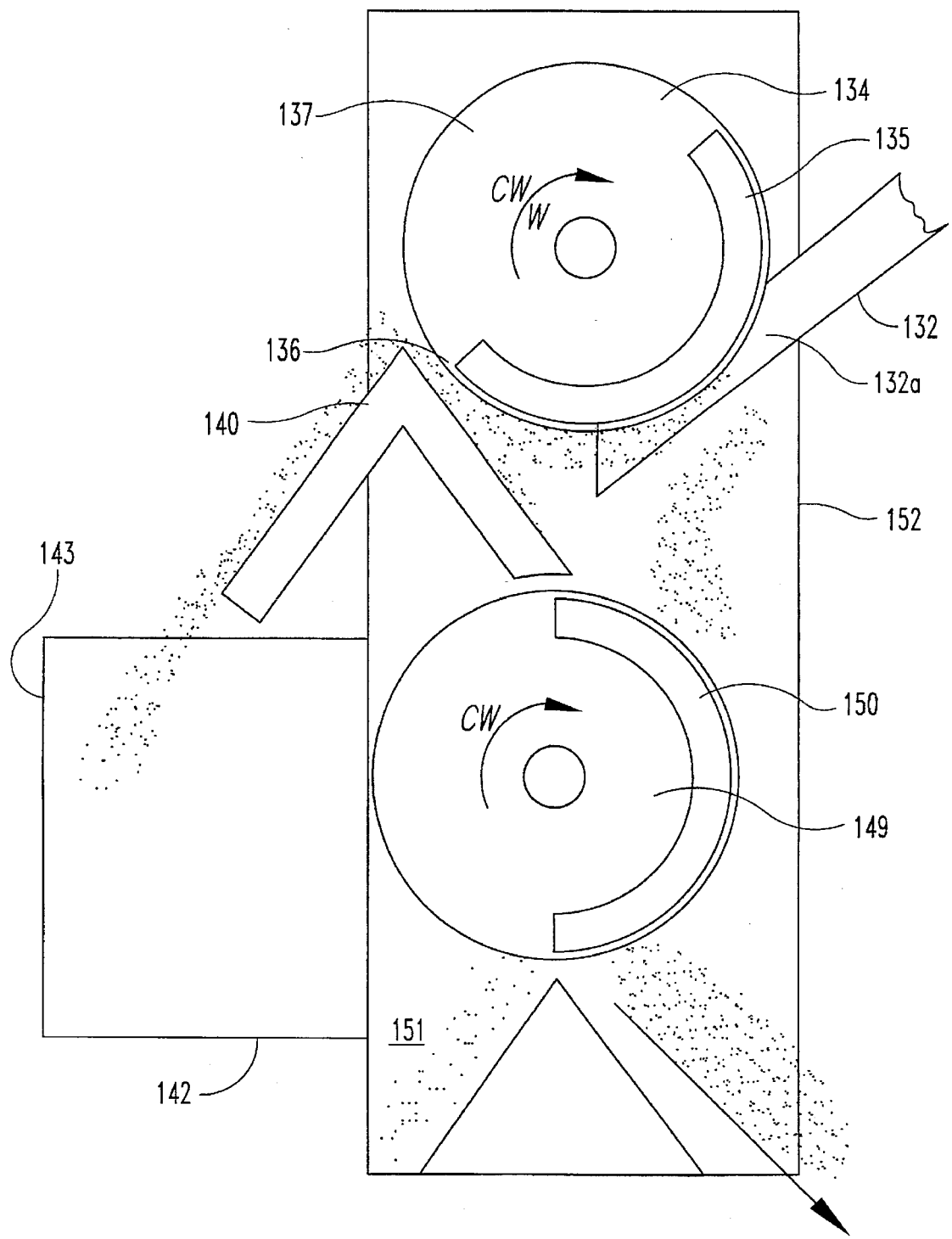
FIG. 11 is an end elevational view of the magnetic separator 82 of FIG. 7.
Figure 12:
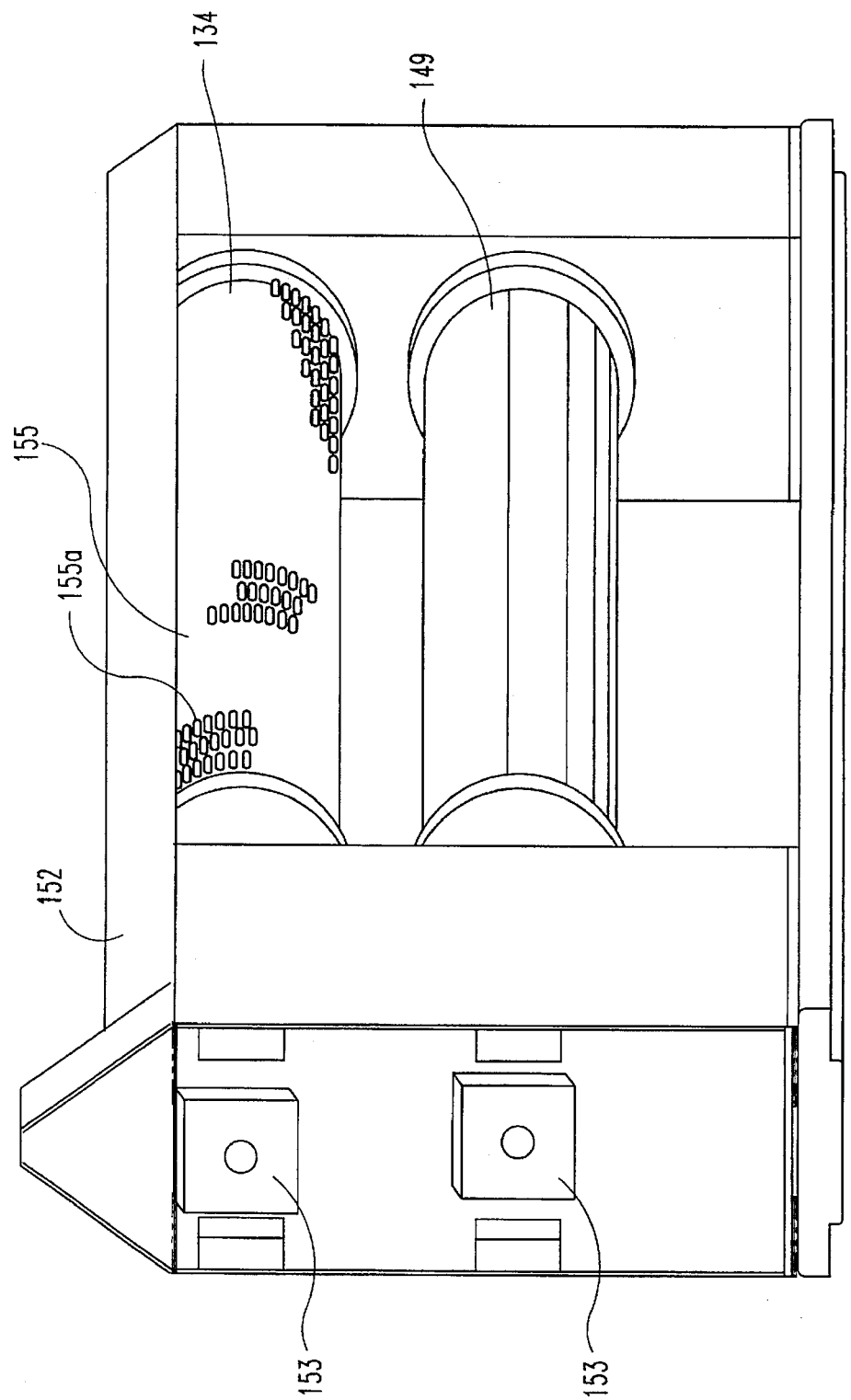
FIG. 12 is a perspective view of the magnetic separator of FIG. 11.

The magnetic separator 82 is mounted on a slidable rail system 131 that is installed within chamber 35. The rail system 131 permits the magnetic separator 82 to be readily removed from within the chamber. 35 for servicing and repair. The blasting material that passes between the moveable plate 115 and the housing 114 of the rotary scalper 80 enters the magnetic separator 82. With reference to FIGS. 11 and 12, there is illustrated a blasting material feeder 132 for gravity feeding the blasting material tangentially to an upper rotating non-magnetic cylindrical drum 134 which has a magnet 135 positioned within. An alternate embodiment utilizes an upper rotating magnetic cylindrical drum, and a scraper that contacts the cylindrical drum. The blasting material feeder 132 includes a distributor portion 132a that assists in delivering the blasting material evenly to the upper rotating non-magnetic cylindrical drum 134. The blasting material feeder 132 orients the blasting material to enter the magnetic separator 82 substantially tangent to the lower cylindrical portion 136 of rotating non-magnetic drum 134. The blasting material is fed proximate to the drum along a path such that the majority of non-magnetically attractable material Will not contact the surface of the drum. In the preferred embodiment the blasting material is not directed at the upper cylindrical portion 137 of the upper drum 134.

A majority of the blasting material that is magnetically attractable will by the magnetic pull be attracted to the upper rotating cylindrical drum 134. A dividing member 140 is situated parallel to the upper cylindrical drum 134 in a spaced apart relationship from the location where the magnet 135 ends. In the preferred embodiment, the dividing member 140 is moveable to decrease or increase the radial spacing between the dividing member 140 and the upper rotating drum 134, but the dividing member 140 does not contact the rotating non-magnetic cylindrical drum 134. The upper rotating non-magnetic cylindrical drum 134 transports the magnetically attractable abrasive material from its point of entry into the magnetic separator 82 to the location where the magnet 135 terminates, and the magnetically attractable abrasive grit material is ejected over the dividing member 140 into a first outlet. Further, the substantially pure abrasive grit material passes over the dividing member 140 and is pulled by gravity through an air wash assembly 142.

Air wash assembly 142 has a plenum 143 that is connected to an auxiliary air blower 144 located in the rear chamber portion 125 of chamber 35. The auxiliary air blower 144 provides the air flow for the air wash assembly 142, and is connected to the dividing wall 123 that splits the chamber 35 into a forward chamber portion 124 and a rear chamber portion 125. Plenum 143 connects the air flow from the auxiliary blower 144 to the magnetic separator 82. As the substantially pure abrasive grit material drops by gravity through the plenum 143, air is blown through the abrasive grit by the auxiliary blower 144 to separate the lighter contaminants such as red oxide flakes, dirt, and the like from the high purity abrasive grit. The substantially pure abrasive grit material exits air wash assembly 142 and is transported by the third flight portion 102 of lift wheel 85 to air lock 81.

Referring to FIGS. 6 and 7, there is illustrated an airlock 81 having an upper chute 145 for receiving the substantially pure abrasive grit material exiting the magnetic separator 82. The abrasive grit material is gravity fed from upper chute 145 into the airlock 81. A first moveable airlock gate 146 is disposed within the upper portion of airlock 81, and a second moveable airlock gate 147 is disposed within the lower portion of airlock 81. The gates 146 and 147 are moveable to control the flow of substantially pure abrasive grit material into and out of an airlock chamber 148.

The airlock chamber 148 is disposed between the gates 146 and 147. In the preferred embodiment a pair of valves (not illustrated) are connected to the airlock chamber 148 for allowing the pressure in the airlock chamber 148 to be adjusted. A first valve is disposed in fluid communication between the airlock chamber 148 and the environment external to the chamber 35. The second valve is disposed in fluid communication between the airlock chamber 148 and the interior volume of the chamber 35. In the preferred embodiment before either gate 146 or 147 is opened, the pressure in air lock chamber 148 is brought to a level substantially equivalent to that pressure on the other side of the gate to be opened. After the airlock chamber 148 has been filled with a quantity of substantially pure abrasive grit material, the first gate 146 is closed. The first airlock gate 146 closes against an elastomeric seal which enables an airtight seal to be formed even if a small quantity of abrasive grit material is positioned between the gate and the stop which the gate abuts. The pressure in airlock chamber 148 is then elevated to a level substantially equivalent to that outside chamber 35. Second moveable airlock gate 147 is opened after the airlock chamber 148 is pressurized. The second moveable airlock gate 148 also engages an elastomeric seal when it is in the closed position. Opening of the second airlock gate 148 allows the substantially pure abrasive grit material to be gravity fed through outlet port 52 and onto the transfer conveyor 50.

Any abrasive blasting material that is not attracted to the upper rotating non-magnetic cylindrical drum 134 is fed to the lower rotating non-magnetic cylindrical drum 149 which has a magnet 150 positioned within. An alternate embodiment utilizes a lower rotating magnetic cylindrical drum, and a scraper that contacts the cylindrical drum. The lower rotating non-magnetic cylindrical drum 149 moves in a clockwise direction and any magnetically attractable abrasive grit material attracted to it is moved to a separation point where the magnet 150 ends. At the location where the magnet 150 ends the blasting material is separated into two categories, substantially pure waste material and recyclable mixed material. The substantially pure waste material does not adhere to the lower rotating non-magnetic cylindrical drum 149 and is discarded into a second outlet that is connected to the centralized waste auger 120. The lower rotating non-magnetic cylindrical drum 149 drops the recyclable mixed material into a third outlet 151. The third outlet 151 passes the material into a chute which transports it to the second flight portion 101 of lift wheel 85. Second flight portion 101 transports the mixture of waste and abrasive grit material from the the magnetic separator 82 to the input chute 110 of the rotary scalper 80, for another pass through the separation process.

Referring to FIG. 12, there is illustrated the magnetic separator 82 having the aforementioned components of the magnetic separator incorporated into a housing 152 that provides the structure to support the two rotating non-magnetic cylindrical drums 134 and 149 in a spaced apart relationship (the blasting material feeder 132 has been removed from FIG. 12 for clarity). The cylindrical drums 134 and 149 are covered with an elastomeric covering material 155, which is covered with dimples 155a (in FIG. 12 the elastomeric covering 155 is only illustrated on drum 134, however it is understood that covering material 155 also covers drum 149). Preferably, the elastomeric covering material 155 is ¼ inch in thickness and has dimples 155a formed on it that are ⅛ inch in depth. The dimples 155a are arranged in a diamond pattern wherein they are spaced apart ½ inch axially, and spaced apart ¼ inch around the circumference of the drum. The elastomeric coating 155 minimizes the amount of mechanical abrasion caused by the blasting material to the drum, and provides a plurality of recesses into which the material nests on the rotating drum. Each rotating cylindrical drum 134 and 149 is driven by a hydraulic motor 153. The hydraulic motors 153 are driven by high pressure fluid that is provided by hydraulic pump 25.

Figure 13:
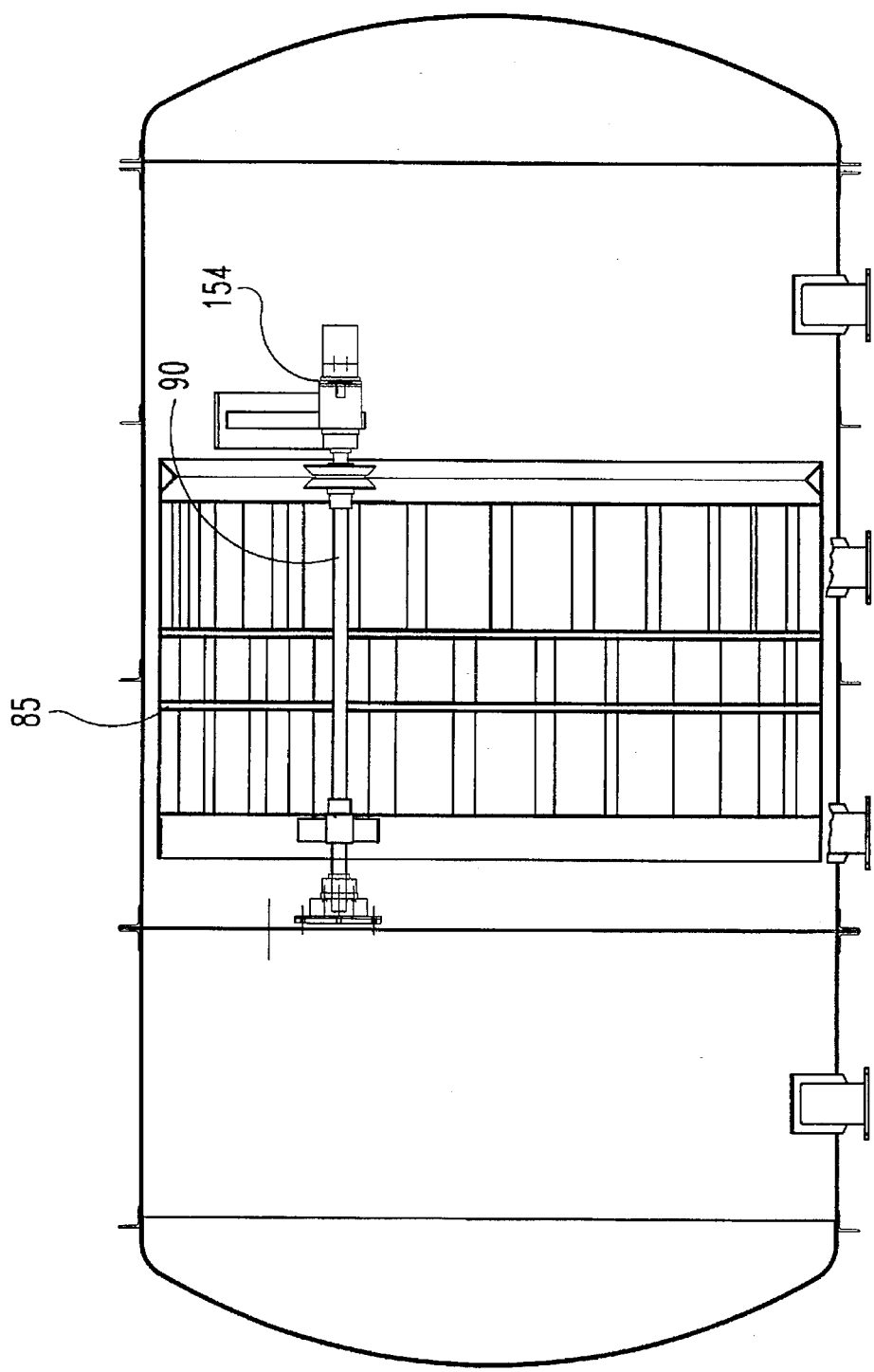
FIG. 13 is an illustrative view of the lift wheel 85 of FIG. 7 having the drive shaft and drive wheels installed.
Figure 14:
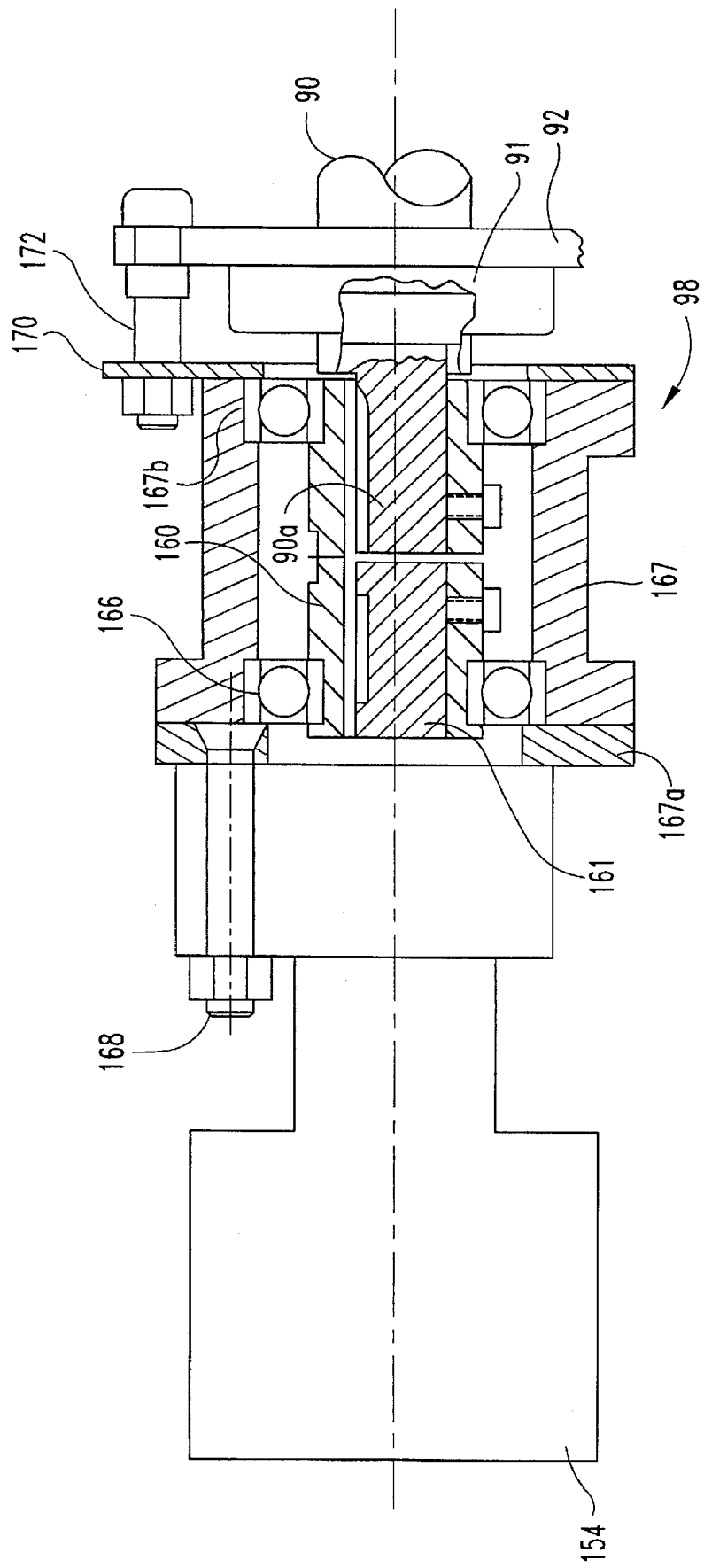
FIG. 14 is a sectional view of the flexible motor mount 98 of FIG. 7.
Figure 15:
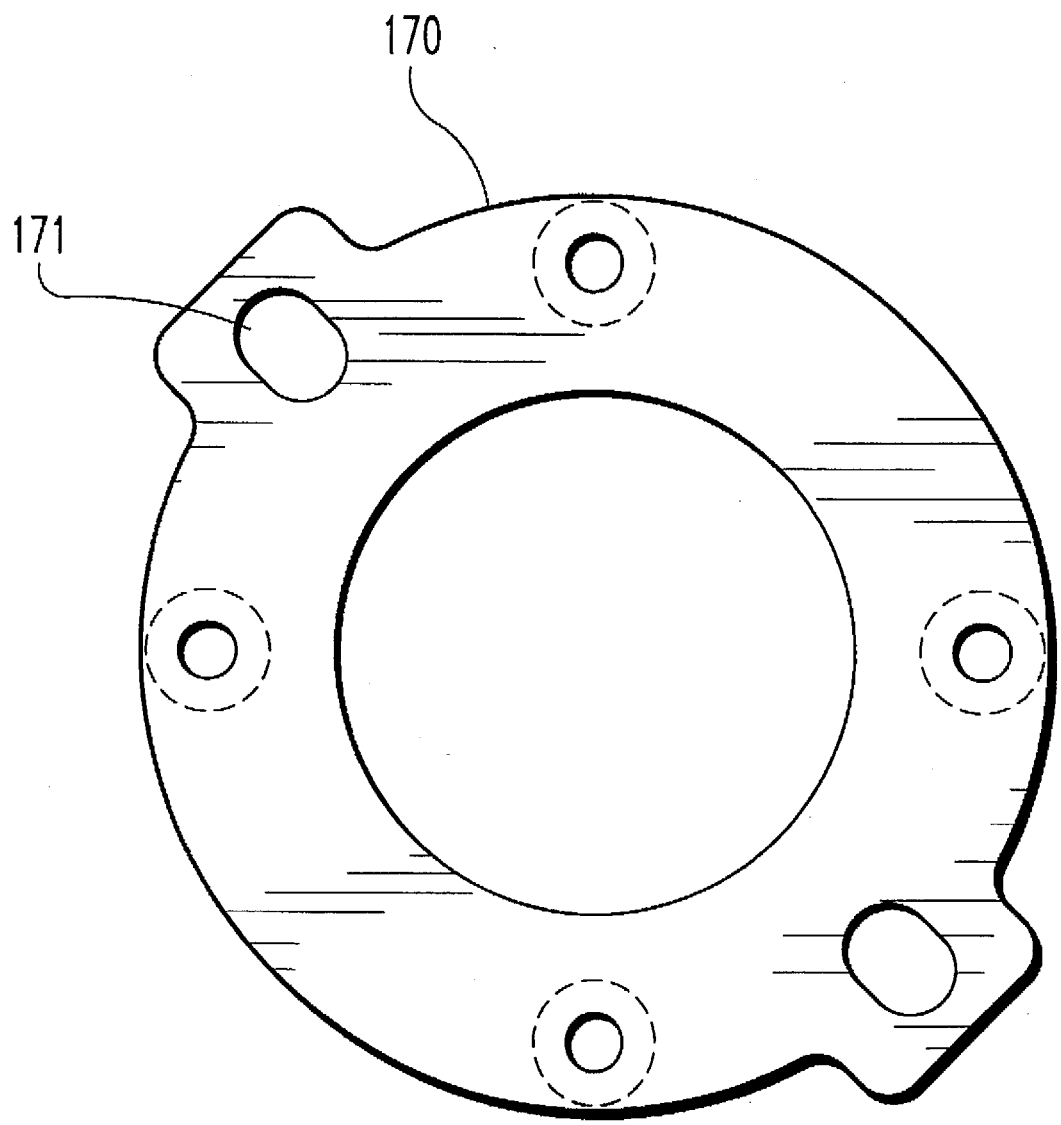
FIG. 15 is a top plan view of the mounting plate of the motor mount shown in FIG. 14.

The lift wheel assembly 85, as illustrated in FIG. 13, is mounted on a pair of drive shafts 90 (only one of which is shown in FIG. 13). A drive assembly which includes a hydraulic motor 154 is coupled to the drive shaft by a novel flexible motor mount 98 as shown in FIGS. 14 and 15. The hydraulic motor 154 being cantilevered through the flexible motor mount 98 such that its weight is substantially supported by the drive shaft 90. Drive shaft 90 rotates on bearing 91 that is mounted to bracket 92 that is affixed to chamber 35. The flexible motor mount 98 includes an inner cylindrical collar 160 having a axial bore that receives both the output shaft 161 from the hydraulic motor 154, and the first driven end 90a of drive shaft 90. Output shaft 161, the first end of 90a of drive shaft 90 and the inner collar 160 have a keyway machined therein for receiving a key 162. The key 162 prevents the shafts 90 and 161 from rotating relative to the inner collar 160. Further, the inner collar 160 holds the output shaft 161 and the first driven end 90a of drive shaft 90 in a colinear relationship, and is in substantially circumferential contact with the shafts. A pair of bearings 166 are situated on the outer surface of collar 160 for permitting the inner cylindrical collar to rotate freely thereon. The bearings 166 are mounted between the inner cylindrical collar 160 and an outer housing 167.

The outer housing 167 has an end 167a that is connected to the hydraulic motor 154 by a plurality of bolts 168. The opposite other end 167b of housing 167 has a mounting plate 170 affixed thereto. Mounting plate 170 has a pair of anti-rotation slots 171 formed therein. Anti-rotation Slots 171 are designed to receive a bolt 172 therein. The bolt 172 extends parallel with the drive shaft and has a first end and a second distal end. The first end being coupled to the chamber 35 and the second distal end of bolt 172 being disposed within an anti-rotation slot 171. In the preferred embodiment only one bolt 172 is disposed within one of the anti-rotation slots 171. However, it is contemplated that multiple bolts 172 could be used to engage multiple anti-rotation slots 171. The anti-rotation slots 171 are sized relative to the diameter of the bolt 172 to permit relative motion between them. The combination of the bolt 172 and the anti-rotation slot 171 is solely to prevent the hydraulic motor from rotating about the axis of its output shaft while allowing the motor to wobble in response to imperfect shaft alignment.

Figure 16:
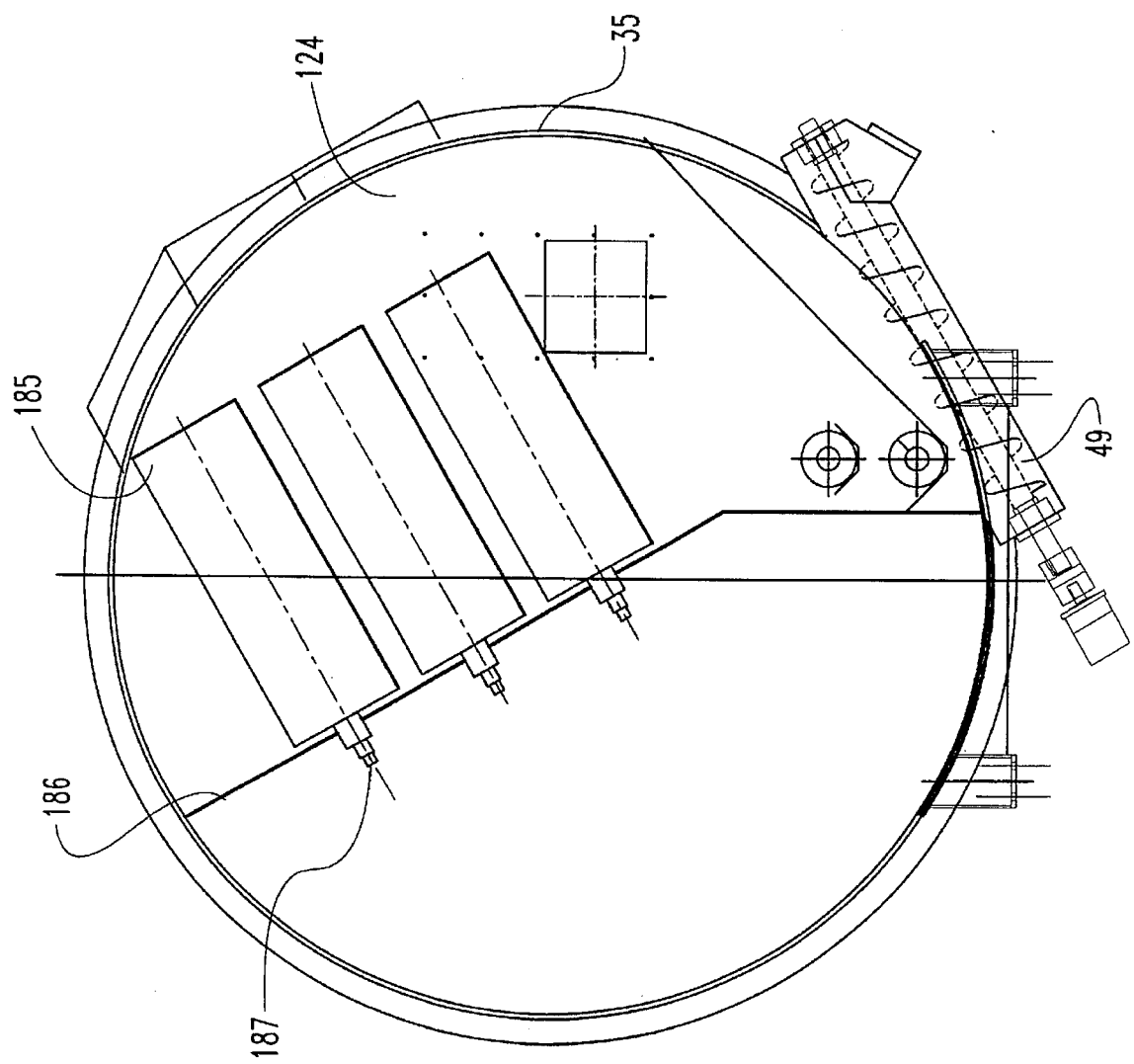
FIG. 16 is a cut-a-way illustrative view of the FIG. 1 abrasive grit blasting recovery system chamber taken along line AA.

Referring to FIG. 16, there is illustrated a cross sectional view of the forward portion 124 of chamber 35. A group of dust collection filters 185 are removably attached to a dividing wall 186 that separates the forward chamber portion 124 into two sections. On the other side of dividing wall 186 from the dust collection filters 185 is a group of air nozzles 187 that are mounted to wall 186 and pass through clearance openings in the wall into the dust collection filters 185. A pressure sensing device, that is generally known in the art, measures the differential pressure between the outside surface of the dust collection filter 185 and the inside surface of this filter. The air nozzles 187 can be manually activated by a service technician to deliver a blast of air to the dust collection filters 185, or the air nozzles 187 will automatically deliver a blast of air to the dust collection filters 185 when a predetermined differential pressure is detected at a specific volumetric flow rate. A blast of pressurized air is delivered to the dust collection filters 185, thereby removing contaminants from the filters.

An example is now provided illustrating the material flow through the mobile apparatus 20 as the blasting material is picked up from the work surface and returned to the clean storage bin 51. In operation, vacuum generator 28 produces a substantially reduced pressure in chamber 35, and a vacuum strong enough for collecting the blasting material through a hose 44. The vacuum generator 28 pulls the blasting material through the hose and deposits the material into the knock out hopper 105. Blasting material greater than one inch in size is separated within the knockout hopper to prevent later blocking of the material flow within the chamber 35. Blasting material smaller than one inch in size is dropped into the metering auger 108, positioned beneath knock out hopper 105. The metering auger 108 transfers the material to the first flight portion 100 of lift wheel 85.

Blasting material from the metering auger 108 is transferred to the rotary scalper 80 by rotating lift wheel 85. The rotary scalper 80 separates any material less than 3/16 inch in diameter from the blasting material. Abrasive grit material and waste material less than 3/16 inch in diameter fall by gravity into the housing 114 beneath the rotary scalper. Blasting material from the housing 114 beneath the rotary scalper to the magnetic separator 82 is transferred through a gravity feeder. The magnetically attractable abrasive grit material is then separated from the blasting material in the magnetic separator 85. Substantially pure magnetically attractable abrasive grit material exits from the first outlet of the magnetic separator, passes through the air wash assembly 142, and is received by the third flight portion 102 of lift wheel 85. Substantially pure abrasive grit material is then transferred to the upper chute 145 of air lock 81 by rotating the lift wheel 85.

The first gate 146 of the air lock 81 is opened while the second gate 147 is closed, and some abrasive grit material is put into the air lock chamber 148 using gravity. The first gate 146 is only opened after the pressure in the airlock chamber 148 is brought to a level substantially equivalent to that pressure on the other side of the first gate. The first moveable air lock gate 146 is then closed and the pressure within the airlock chamber 148 is increased to pressure near that on the other side of the second gate 147. After pressurizing the airlock chamber 148, the second gate 147 is opened and the substantially pure grit from the airlock chamber 148 is transferred to the transfer conveyor 50 by gravity. Belt 53 on the transfer conveyor 50 moves abrasive grit material to the clean grit storage bin 51.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. In an apparatus for the separation and recovery of magnetically attractable abrasive grit material from blasting material containing non magnetically attractable waste material and magnetically attractable abrasive grit material, the improvement comprising:

a chamber;

a magnetic separator positioned within said chamber, said magnetic separator having a first rotating non-magnetic drum having at least a portion of its outer surface dimpled and A blasting material feeder positioned to feed blasting material in a gaseous environment proximate said drum along a path such that the majority of non-magnetically attractable waste material will not contact the surface of said drum and the majority of said magnetically attractable grit material will by the magnetic pull of a first magnet positioned within said first drum contact said drum.

2. The apparatus of claim 1 wherein said magnetic separator further comprises a second rotating non-magnetic drum having a magnetic positioned therein, said second drum having an upper cylinder portion positioned for receiving the blasting material from said first drum, and wherein said first magnet is fixedly positioned.

3. The apparatus of claim 1, wherein said drum having an upper cylinder portion and a lower cylinder portion, said blasting material feeder positioned to feed the blasting material below said upper portion of the rotating drum.

4. The apparatus of claim 3, wherein said blasting material feeder for orienting the blasting material substantially tangent to said lower cylinder portion.

5. The apparatus of claim 1, wherein said drum having an elastomeric covering for minimizing mechanical abrasion to said drum.

6. The apparatus of claim 5, wherein said dimples being formed to a depth in said coating.

7. The apparatus of claim 6, wherein said dimples being arranged in a diamond pattern.

8. An apparatus for the separation and recovery of magnetically attractable abrasive grit material from blasting material containing non-magnetically attractable waste material and fine contaminants, and magnetically attractable abrasive grit material, comprising:

a chamber;

a magnetic separator disposed within said chamber for separating magnetically attractable abrasive grit material from the blasting material in a gaseous environment, said magnetic separator having a rotating non magnetic cylindrical drum having a magnet positioned within for attracting magnetically attractable abrasive grit material, said drum having an upper cylinder portion and a lower cylinder portion; and a blasting material feeder situated to feed the blasting material below said upper portion of the rotating drum for facilitating the gravitational separation of the non-magnetically attractable material from the magnetically attractable material, said, blasting material feeder having a distributor portion for delivering the blasting material evenly to said rotating drum.

9. A mobile apparatus for the separation and recovery of magnetically attractable abrasive grit material from blasting material containing non magnetically attractable waste material and magnetically attractable abrasive grit material, comprising:

a vacuum generator;

a chamber, said chamber having a blasting material inlet and a vacuum outlet, said vacuum outlet being connected to said vacuum generator for reducing the pressure in said chamber, said blasting material inlet being suitable for receiving blasting material;

a magnetic separator disposed within said chamber for separating said magnetically attractable abrasive grit material from said blasting material;

a flexible hose coupled to said blasting material inlet for providing a collection path for blasting material, said hose having a collection end; and said vacuum generator having sufficient capacity to allow vacuum collection through said flexible hose.

10. The apparatus of claim 9, wherein said vacuum generator has a vacuum draw of at least 20 inches of mercury (Hg) when said collection end of said flexible hose is closed.

11. The apparatus of claim 9, wherein said vacuum generator has a vacuum draw of at least 25 inches of mercury (Hg) When said collection end of said flexible hose is closed.

12. The apparatus of claim 9, wherein said magnetic separator has a non magnetic rotating cylindrical drum with a magnet positioned within, said magnetic separator having a blasting material feeder positioned to feed the blasting material tangentially to said drum.

13. The apparatus of claim 12, wherein said drum having a upper cylinder portion, said blasting material feeder positioned to feed the blasting material below said upper cylinder portion of the rotating drum.

14. The apparatus of claim 13, wherein said blasting material feeder feeds by gravity.

15. The apparatus of claim 12, wherein said blasting material feeder feeds by gravity.

16. A mobile apparatus for the separation and recovery of abrasive grit material from blasting material containing waste material and abrasive grit material, comprising:

a vacuum generator;

a chamber, said chamber having a blasting material inlet and a vacuum outlet, said vacuum outlet being connected to said vacuum generator for reducing the pressure in said chamber, said blasting material inlet being suitable for receiving blasting material;

a flexible hose coupled to said blasting material outlet for providing a collection path for blasting material; and a mechanical separator coupled to said blasting material inlet, said mechanical separator having three outlets, a first outlet for high purity abrasive grit material, a second outlet for waste material substantially free of abrasive grit material, and a third outlet for mixed waste material and abrasive grit material.

17. The apparatus of claim 16, wherein said mechanical separator includes a magnetic separator, said magnetic separator having a first rotating non magnetic cylindrical drum having a first magnet positioned within, and a second rotating non magnetic cylindrical drum having a second magnet positioned within.

18. The apparatus of claim 17 in which said mechanical separator is disposed within said chamber for separating said waste material from said abrasive grit material.

19. The apparatus of claim 18, wherein said magnetic separator includes a blasting material feeder, said blasting material feeder positioned to feed blasting material tangentially to said first drum, and said third outlet is connected to a prior portion of said mechanical separator for recycling to allow another chance for its contents to be again sorted among said first outlet, second outlet and third outlet.

20. The apparatus of claim 19, wherein said blasting material feeder feeds by gravity.

21. The apparatus of claim 18, further comprising an air blower, said blower situated for blowing air past abrasive grit material exiting from said first rotating drum.

22. An apparatus for the separation and recovery of magnetically attractable abrasive grit material from blasting material containing non magnetically attractable waste material and magnetically attractable abrasive grit material, comprising:

a chamber; and a magnetic separator positioned within said chamber, said magnetic separator having a rotating non-magnetic drum with-a stationary magnet positioned therein, a blasting material feeder positioned to feed blasting material within a gaseous fluid proximate said drum along a path such that gravitational forces acting on the non magnetically attractable material will draw the non magnetically attractable material away from the magnetically attractable material that is being drawn to the surface of said drum by the magnet positioned therein.

* * * * *

UNITED STATES PATENT AND TRADEMARK OFFICE
CERTIFICATE OF CORRECTION

PATENT NO. : 5,657,876
DATED : August 19, 1997
INVENTOR(S) : John C. Drenter et al.

It is certified that error appears in the above-identified patent and that said Letters Patent is hereby corrected as shown below:

In Item 57 of the Title Page, line 13, please insert --a-- after "by".

In column 5, line 8, please delete "the", second occurrence.

In column 7, line 54, please change "110. Of" to --110 of--.

In column 8, line 32, please delete the period.

In column 8, line 50, please change "Will" to --will--.

In column 10, line 64, please change "Slots" to --slots--.

In column 12, line 28, please change "A" to --a--.

In column 13, line 8, please delete the second comma.

In column 13, line 37, please change "When" to --when--.

UNITED STATES PATENT AND TRADEMARK OFFICE
CERTIFICATE OF CORRECTION

PATENT NO. : 5,657,876
DATED : August 19, 1997
INVENTOR(S) : John C. Drenter et al.

It is certified that error appears in the above-identified patent and that said Letters Patent is hereby corrected as shown below:

In column 14, line 45, please change "with-a" to --with a--.

Signed and Sealed this

Twenty-third Day of December, 1997

Attest:

Attesting Officer

BRUCE LEHMAN
Commissioner of Patents and Trademarks